(12) United States Patent
DePierro et al.

(10) Patent No.: US 10,314,420 B2
(45) Date of Patent: Jun. 11, 2019

(54) DISPENSING APPARATUS

(71) Applicants: John DePierro, Fallbrook, CA (US); Lucian Scripca, Carlsbad, CA (US)

(72) Inventors: John DePierro, Fallbrook, CA (US); Lucian Scripca, Carlsbad, CA (US)

( * ) Notice: Subject to any disclaimer, the term of this patent is extended or adjusted under 35 U.S.C. 154(b) by 0 days.

(21) Appl. No.: 15/963,384

(22) Filed: Apr. 26, 2018

(65) Prior Publication Data

US 2018/0317683 A1 Nov. 8, 2018

Related U.S. Application Data

(60) Provisional application No. 62/503,136, filed on May 8, 2017.

(51) Int. Cl.
*A47G 19/34* (2006.01)
*A47J 31/40* (2006.01)

(52) U.S. Cl.
CPC ............ *A47G 19/34* (2013.01); *A47J 31/404* (2013.01)

(58) Field of Classification Search
CPC ................................ A47G 19/34; A47J 31/404
See application file for complete search history.

(56) References Cited

U.S. PATENT DOCUMENTS

| | | | | |
|---|---|---|---|---|
| 2,077,980 A | * | 4/1937 | Bell | A47J 42/40 141/369 |
| 3,169,675 A | * | 2/1965 | Gutzmann | A47G 19/34 222/185.1 |
| 4,569,463 A | * | 2/1986 | Pellegrino | A47G 19/34 222/185.1 |
| 5,123,572 A | * | 6/1992 | Ford | A47G 19/34 222/135 |
| 5,927,558 A | * | 7/1999 | Bruce | G01F 11/24 222/185.1 |
| 6,766,924 B1 | * | 7/2004 | Ophardt | G01F 11/24 222/368 |
| 6,871,762 B1 | * | 3/2005 | Cripps | E01H 10/002 141/231 |
| 6,951,294 B1 | * | 10/2005 | Laberinto | G01F 11/24 222/142 |
| 7,703,639 B2 | | 4/2010 | Landau et al. | |

(Continued)

*Primary Examiner* — Frederick C Nicolas
(74) *Attorney, Agent, or Firm* — James E. Brunton

(57) ABSTRACT

A dispensing apparatus for controllably dispensing a selected beverage media into a reusable single serving filter cup. The dispensing apparatus includes a housing having a single serve filter cup receiving opening for receiving the single serve filter cup and a reservoir for holding a predetermined volume of the beverage media. The reservoir has an inlet opening for receiving the beverage media and an outlet opening for dispensing the beverage media into a dispensing receptacle that is rotatably carried by the housing for movement between a first position wherein the inlet opening of the dispensing receptacle opening is aligned with outlet opening of the reservoir and a second position wherein the outlet opening of the dispensing receptacle is aligned with the single serve filter cup. In operation, rotation of the dispensing receptacle energizes an agitating device that is attached to the reservoir and functions to controllably agitate the reservoir in a manner to inhibit clogging of the beverage media as it is dispensed into the single serve filter cup.

19 Claims, 14 Drawing Sheets

(56) References Cited

U.S. PATENT DOCUMENTS

| | | | |
|---|---|---|---|
| 8,002,153 B2* | 8/2011 | Lowther | G01F 11/18 222/1 |
| 8,439,231 B2* | 5/2013 | Schroedter | B65B 1/36 222/153.13 |
| 8,534,507 B2 | 9/2013 | Gronholm | |
| 9,107,537 B2 | 8/2015 | Bernhardsgruetter et al. | |
| 9,265,377 B2 | 2/2016 | de Graaff et al. | |
| 9,296,502 B1 | 3/2016 | Hollander | |
| 9,339,141 B2 | 5/2016 | Van Os et al. | |
| 9,700,175 B2* | 7/2017 | King | A47J 42/50 |
| 9,903,746 B2* | 2/2018 | Rusch | G01F 11/006 |
| 2013/0101717 A1 | 4/2013 | de Graaff et al. | |
| 2014/0245893 A1 | 9/2014 | Vu | |
| 2015/0060481 A1 | 3/2015 | Murray et al. | |
| 2015/0118367 A1 | 4/2015 | Os et al. | |
| 2015/0257582 A1 | 9/2015 | Oh | |
| 2016/0088975 A1 | 3/2016 | King | |

\* cited by examiner

DISPENSING APPARATUS

CROSS-REFERENCE TO RELATED APPLICATIONS

This is a Non-Provisional application claiming the benefit of co-pending Provisional Application No. 62/503,136 filed May 8, 2017.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to a beverage media dispensing apparatus for controllably dispensing beverage granules, but not limited to, coffee, tea, and hot cocoa into a single serve filter cup of the character used in beverage brewing systems.

Background of the Invention

A number of different types of machines for preparing single servings of coffee, tea, hot cocoa, and like beverages have been suggested in the past. Typically these machines make a single serving of a beverage by mixing hot water with premeasured granules of coffee, tea, or hot cocoa that is contained in disposable, single serve filter cups, or pods, that can be inserted into the machine. The pre-filled, disposable single serve filter cups are generally purchased separately from the brewing systems in prepackaged containers of 12, 18 and 24 units and are typically quite expensive.

The novel apparatus of the present invention enables reusable containers to be easily and expeditiously filled by the user with selected brewing granules thereby providing a meaningful, cost-saving alternative to the prepackaged, disposable single serve filter cups or pods that are presently commercially available.

The present application is based upon Non-Provisional application Ser. No. 62/503,136 filed May 8, 2017, which application is hereby Incorporated by reference as though fully set forth herein.

SUMMARY OF THE INVENTION

By way of brief summary, the present invention concerns a novel dispensing apparatus for controllably dispensing a selected beverage media into a reusable single serving filter cup. More particularly, the dispensing apparatus of the invention includes a housing having a single serve filter cup receiving opening for receiving the single serve filter cup and a reservoir for holding a predetermined volume of the beverage media. The reservoir has an inlet opening for receiving the beverage media and an outlet opening for dispensing the beverage media into a dispensing receptacle that is rotatably carried by the housing for movement between a first position wherein the inlet opening of the dispensing receptacle opening is aligned with outlet opening of the reservoir and a second position wherein the outlet opening of the dispensing receptacle is aligned with the single serve filter cup. In one embodiment of the invention, rotation of the dispensing receptacle energizes an agitating device that is attached to the reservoir and functions to inhibit clogging of the beverage media as it is dispensed into the single serve filter cup.

With the forgoing in mind, it is an object of the invention to provide a dispensing apparatus of the aforementioned character in which the agitation device is provided in the form of a vibrating motor that is connected to the reservoir and is energized upon rotation of the dispensing receptacle.

Another object of the invention is to provide a dispensing apparatus as described in the preceding paragraph in which the vibrating motor is powered by dry cell batteries carried within the housing of the apparatus.

Another object of the invention is to provide a dispensing apparatus as described in the preceding paragraphs in which the dispensing receptacle is provided with a cam that operates strategically positioned limit switches that function to operate the vibratory and dispensing receptacle motors.

Another object of the invention is to provide an alternate form of dispensing apparatus in which the agitation device is provided in the form of a semi-ridged flexible finger, one end of which is connected to the reservoir wall and the free end thereof is disposed in pressural engagement with the dispensing receptacle.

Another object of the invention is to provide a dispensing apparatus in which the interior of the reservoir is lighted and in which the reservoir is provided with a viewing window for viewing the volume of the beverage media contained within the reservoir.

Another object of the invention is to provide a dispensing apparatus in which when the single serve filter cup is properly positioned within the cup receiving chamber of the apparatus, the interior of the cup receiving chamber is illuminated to indicate to the user that the cup is properly positioned.

Another object of the invention is to provide a dispensing apparatus as described in the preceding paragraph in which the single serve filter cup filling operation can be commenced only when the interior of the cup receiving chamber is illuminated thereby preventing duplication of a filling cycle and overfilling the filter cup.

Another object of the invention is to provide a dispensing apparatus of the aforementioned character which includes a pushbutton type, momentary cycle start switch that is illuminated when the filling cycle is in process and goes out when the cycle is complete thereby indicating that it is acceptable to remove the filter cup from the cup receiving chamber.

Another object of the invention is to provide a dispensing apparatus in which the upper portion of the apparatus housing is provided with a safety frame that spans the reservoir inlet opening and guards against a possible injury of the user when filling or accessing the reservoir.

Another object of the invention is to provide a dispensing apparatus of the character described in the preceding paragraphs which is of a simple design, is easy to operate and is attractive in appearance.

DESCRIPTION OF THE INVENTION

Figure 1:
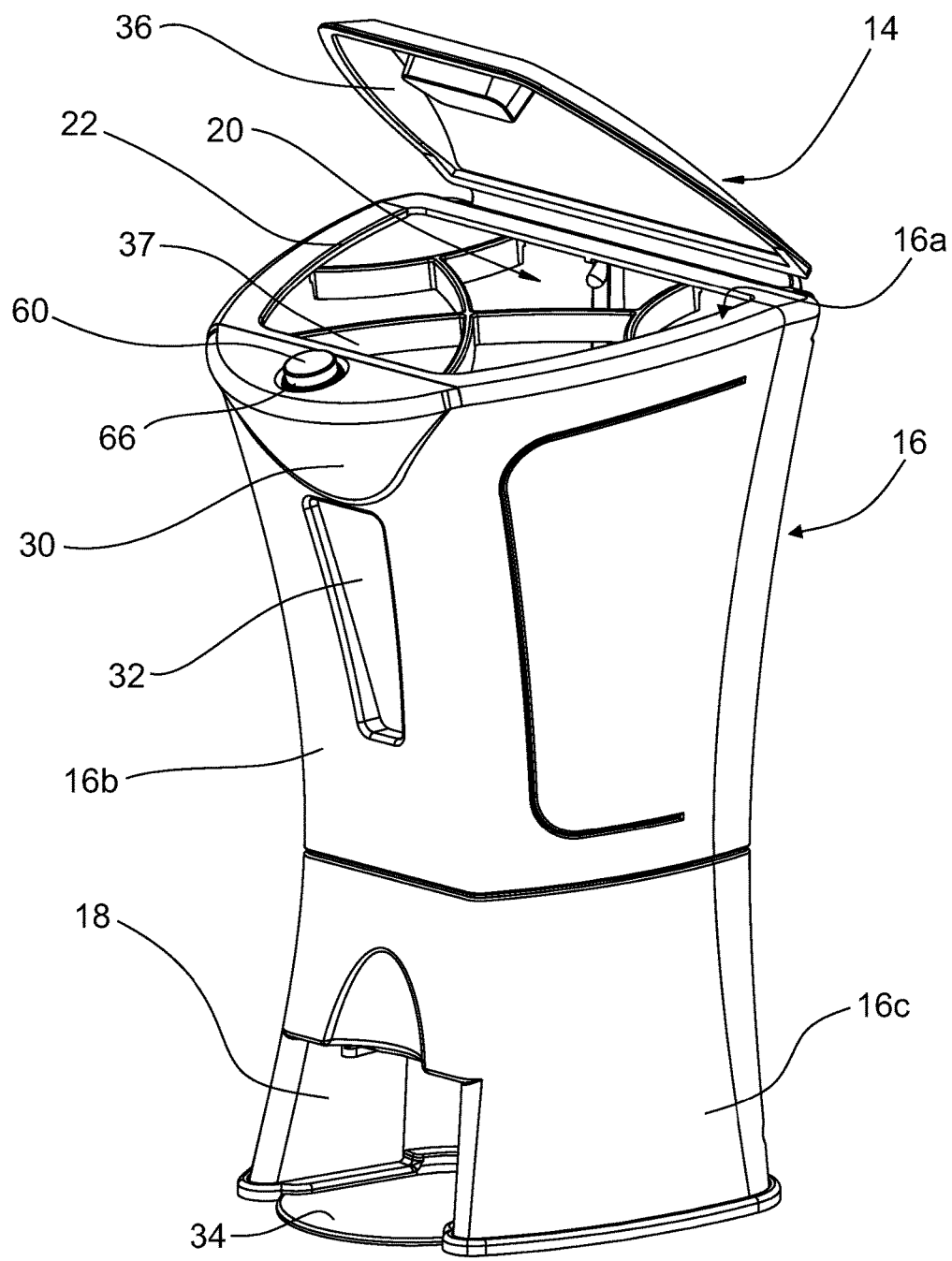
FIG. 1 is a generally perspective view of one form of the dispensing apparatus of the present invention.

Referring to the drawings and particularly to FIGS. 1 through 4, one form of the dispensing apparatus of the present invention is there shown and generally designated by the numeral 14. Apparatus 14, which is specially designed for controllably dispensing a beverage media, but not limited to, coffee granules, tea, powdered chocolate and the like into a single serve filter cup "FC", here comprises a housing 16 having a single serve filter cup receiving opening 18 for receiving a reusable, single serve filter cup "FC" provided with a closure cap "CC" and a media reservoir 20 for holding a volume of a selected beverage media.

Figure 4:
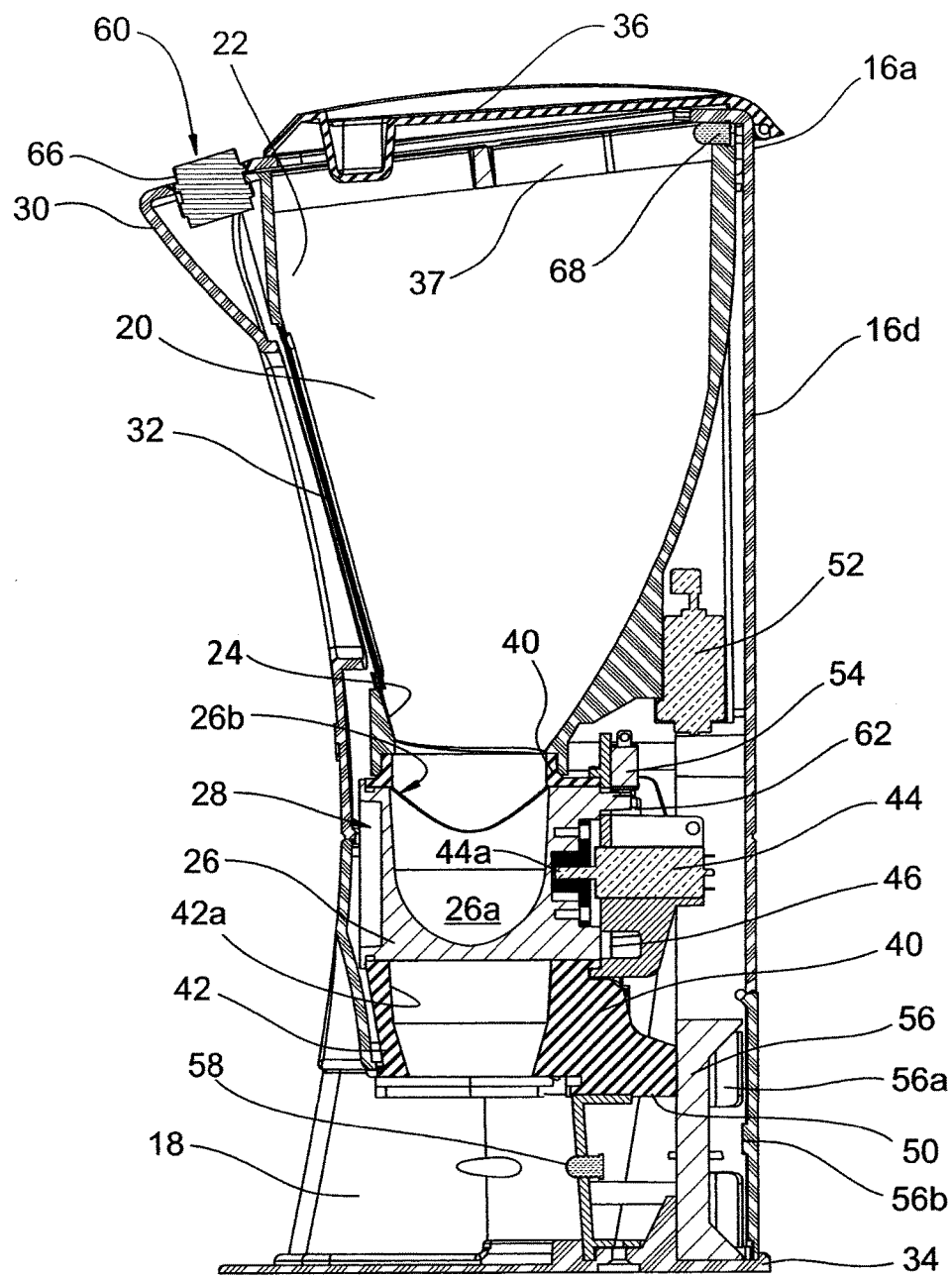
FIG. 4 is a cross-sectional view taken along lines 4-4 of FIG. 3.

As best seen in FIG. 4 of the drawings, reservoir 20 has an upper inlet opening 22 for receiving the beverage media and a lower outlet opening 24 for dispensing the beverage media into a novel, generally cylindrically shaped dispensing receptacle 26 which forms a part of the dispensing assembly 28 of the invention (see also FIG. 8) for controllably dispensing the beverage media from the reservoir 20 into the single serve filter cup "FC"

Figure 2:
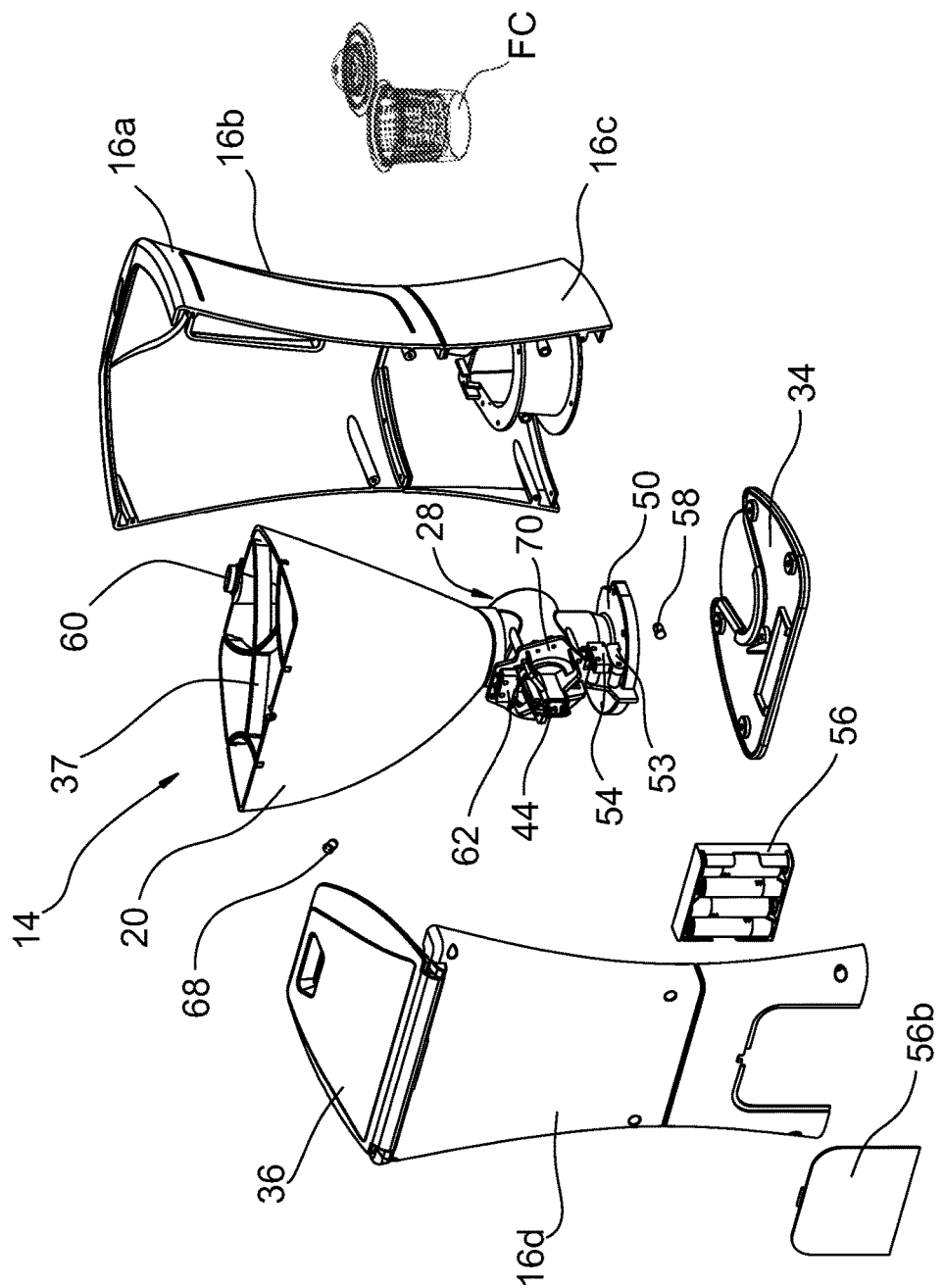
FIG. 2 is a generally perspective, exploded rear view of the dispensing apparatus shown in FIG. 1 illustrating internal construction.
Figure 3:
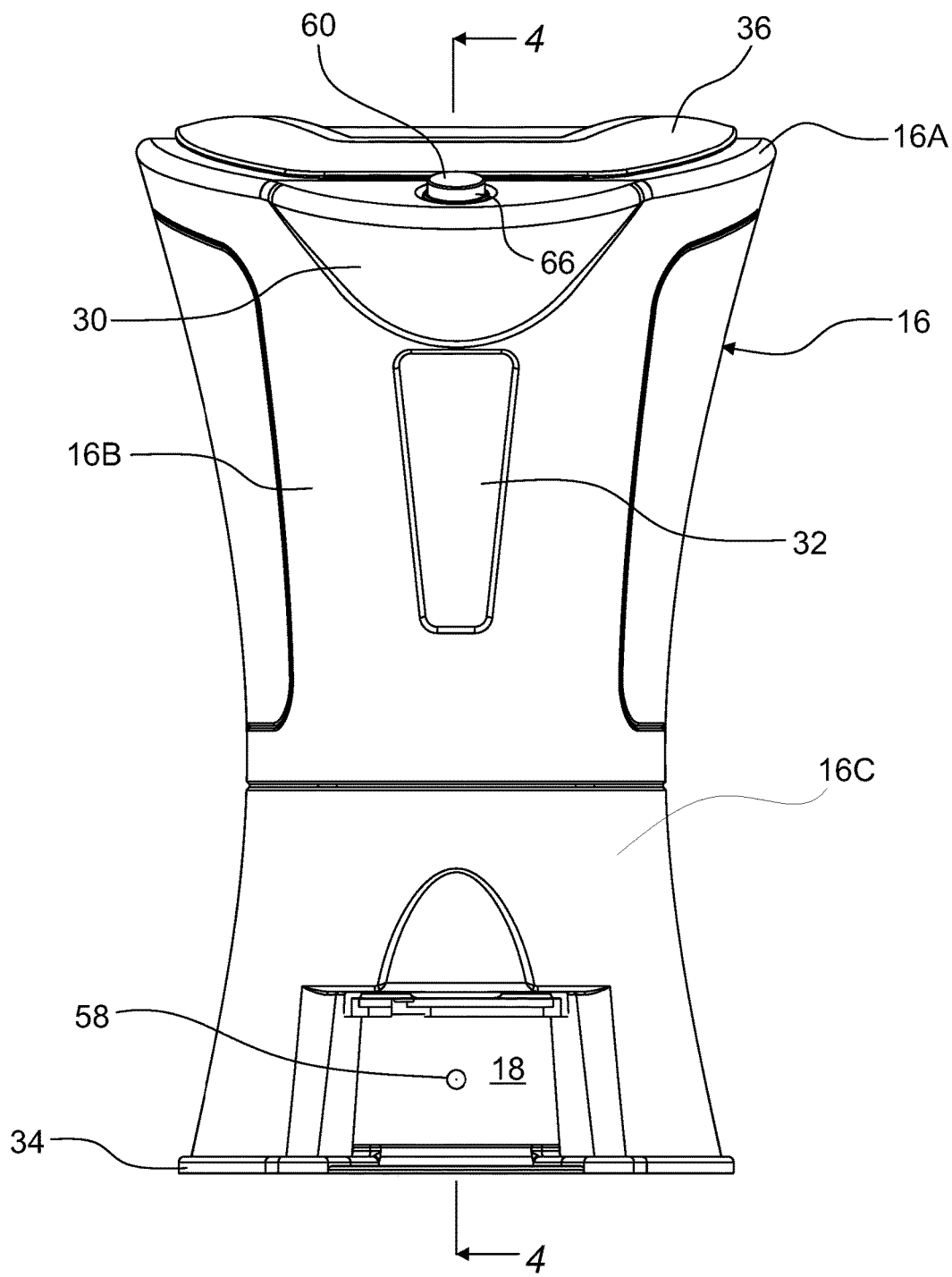
FIG. 3 is a front view of the dispensing apparatus shown in FIG. 1.

As best seen in FIGS. 3 and 4, housing 16 has an upper portion 16a provided with a forwardly extending protuberance 30, a central portion 16b provided with a viewing window 32, a lower portion 16c which rests upon a supporting base 34 and a rear portion 16d (FIG. 2). Pivotally connected to the rear portion 16d of the housing is an access cover 36 for closing the upper inlet opening 22 of reservoir 20. As illustrated in FIG. 1 of the drawings, the upper portion 16a of the housing is provided with a safety frame 37 that guards against possible injury of the user when filling or accessing the reservoir 20.

Figure 9:
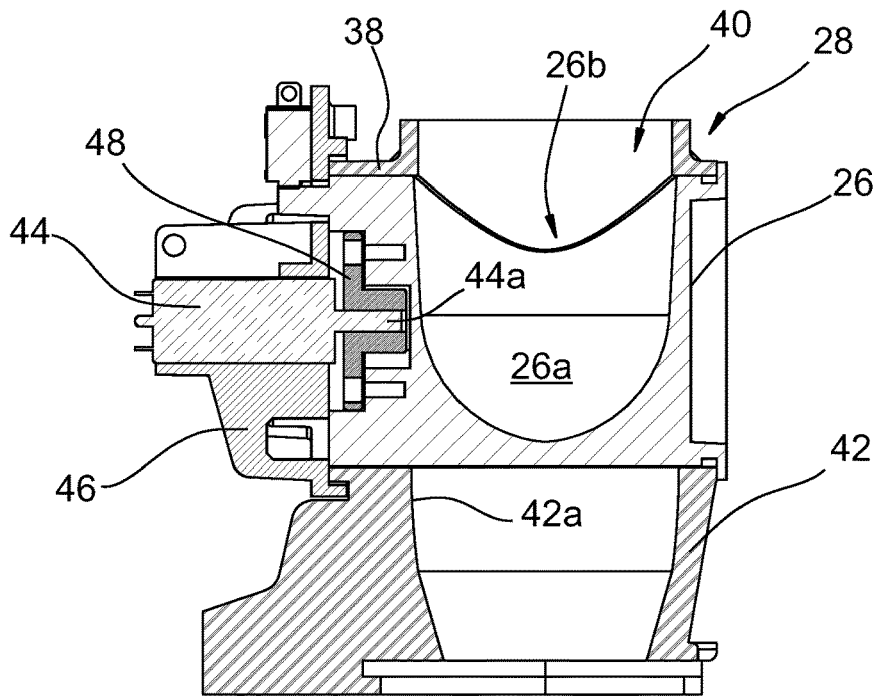
FIG. 9 is an enlarged, fragmentary cross-sectional view of the dispensing assembly of the invention showing the dispensing receptacle thereof as it appears in the initial media loading configuration.
Figure 10:
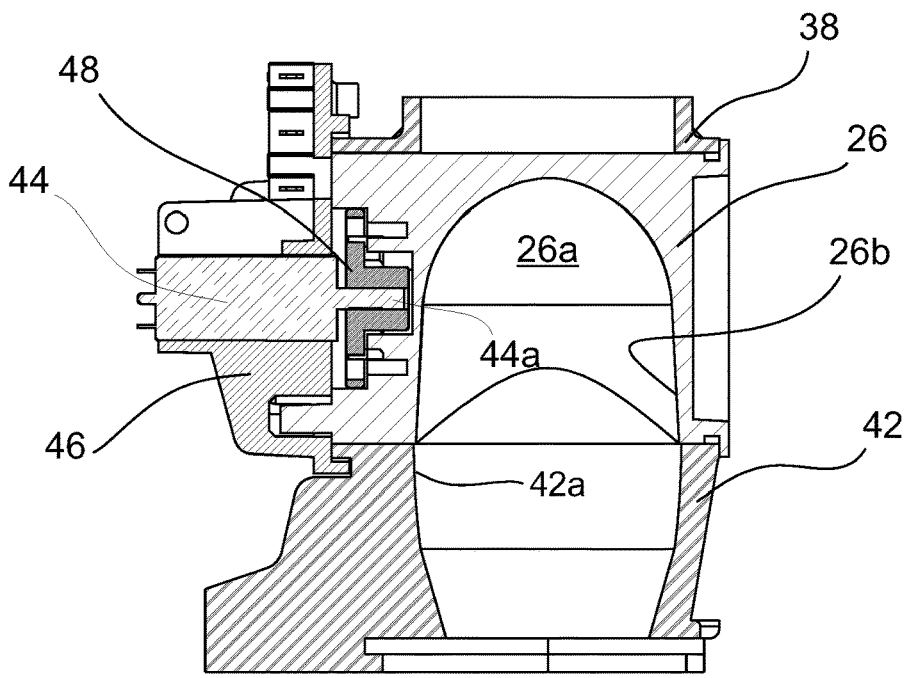
FIG. 10 is an enlarged, fragmentary cross-sectional view similar to FIG. 9, but showing the dispensing receptacle rotated 180° into a media dispensing configuration.

As best seen in FIGS. 9 and 10 of the drawings, dispensing receptacle 26, which includes an interior chamber 26a having a media receiving opening 26b, is rotatably mounted within the barrel 38a of a receptacle housing 38 that includes an upstanding, generally cylindrically shaped inlet segment 40. As illustrated in FIG. 4 of the drawings, inlet segment 40 is connected to the lower outlet opening 24 of reservoir 20. Receptacle housing 38 also includes an outlet here provided in the form of a downwardly extending, generally funnel shaped segment 42 that aligns with the inlet of the filter cup "FC" when the filter cup is in position within housing opening 18.

Figure 5:
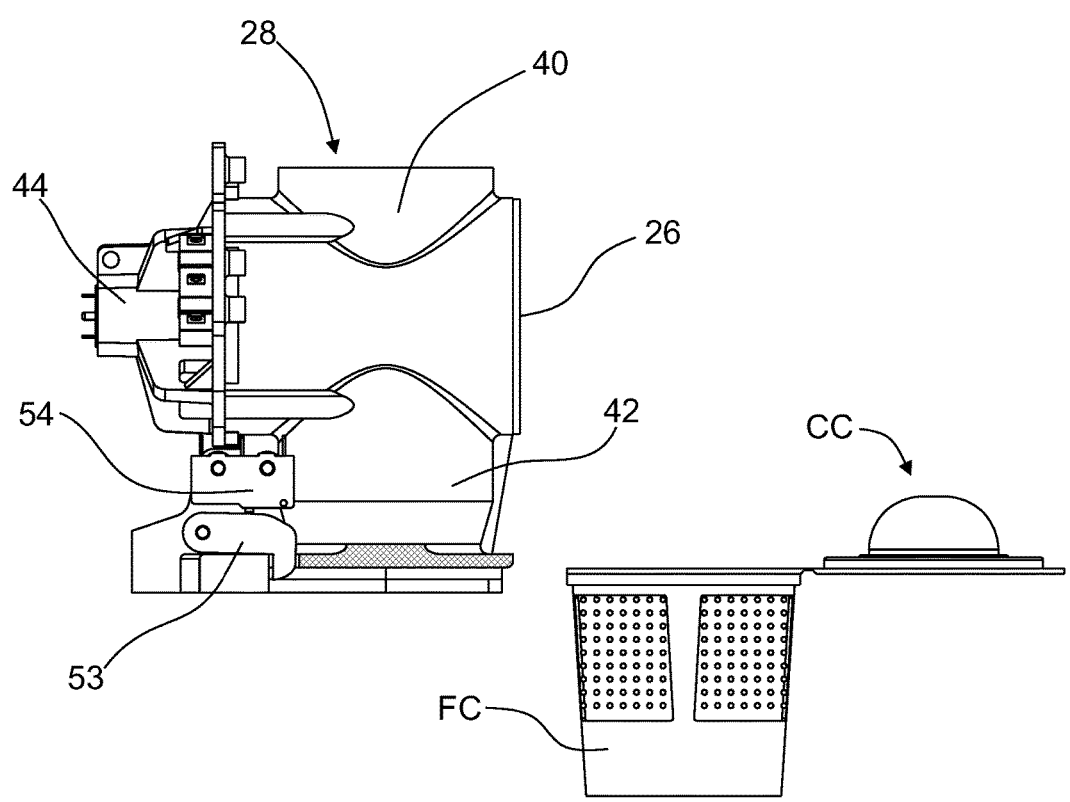
FIG. 5 is a greatly enlarged, fragmentary, exploded, cross-sectional side view of the lower portion of the dispensing apparatus of the invention showing the construction of the single serve filter cup and the dispensing assembly of the invention which functions to controllably dispense a predetermined volume of brewing media into the reusable, single serve filter cup.

Dispensing receptacle 26 is rotatably movable within barrel 38 by an electric motor 44 between the first position shown in FIGS. 4, 5 and 9 wherein media receiving opening 26b is aligned with reservoir outlet opening 24 and a second position shown in FIG. 10 wherein the media receiving opening 26b is aligned with the inlet 42a of funnel shaped segment 42. Electric motor 44, which is securely mounted within a mounting assembly 46, includes a drive shaft 44a that extends into a mounting plate 48 and is operably associated with dispensing receptacle 26 in the manner shown in FIGS. 4, 9 and 10 of the drawings. Motor 44 is readily commercially available from various sources, including Precision Micro Drives, LTD of London, England.

Figure 6:
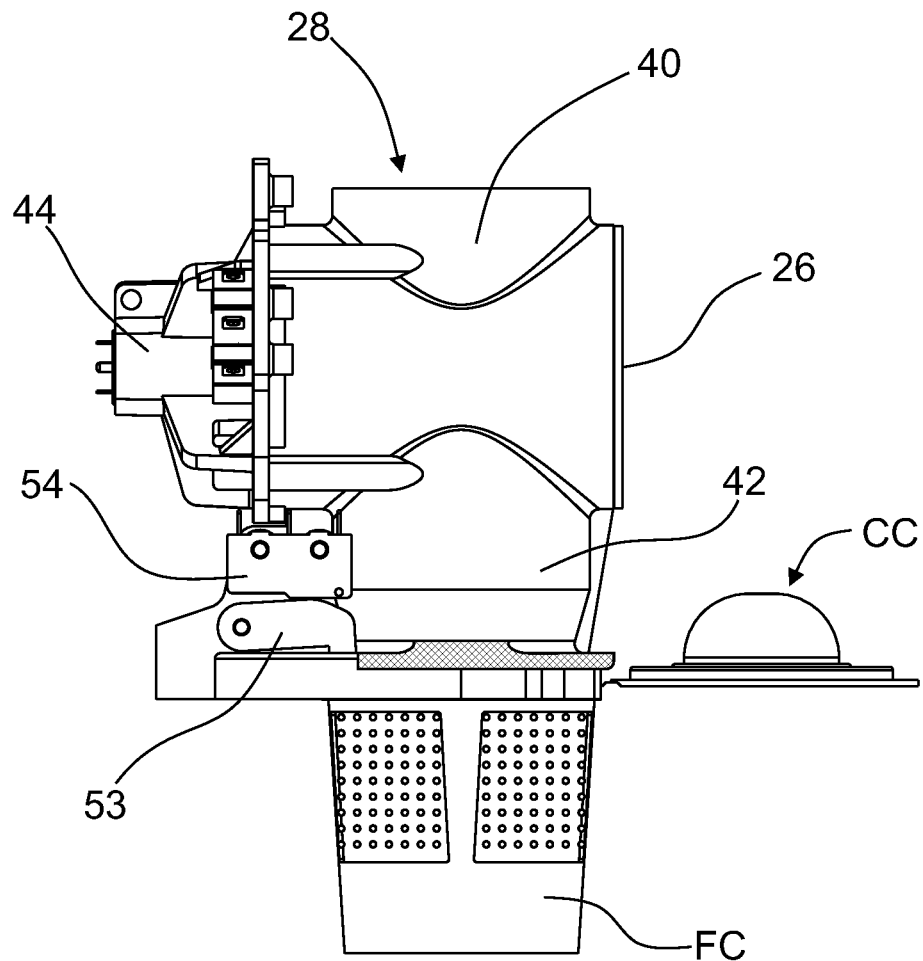
FIG. 6 is a fragmentary view similar to FIG. 5, but showing the single serve filter cup in position within the dispensing assembly of the invention.
Figure 7:
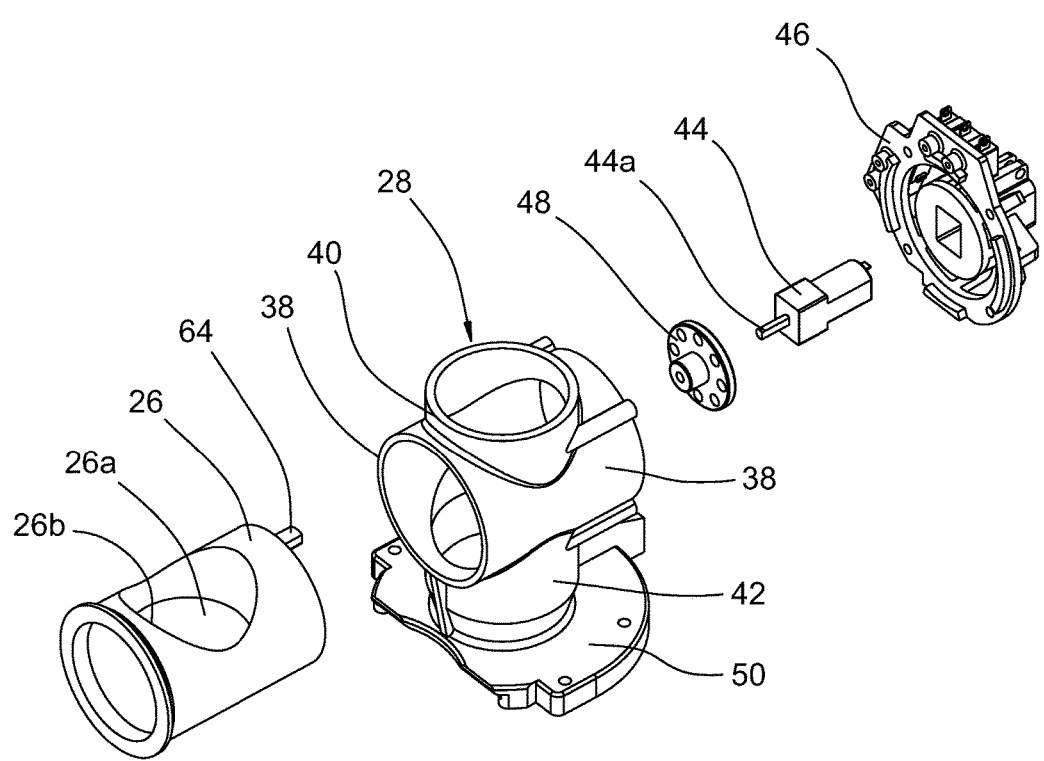
FIG. 7 is a generally perspective, exploded view of the dispensing assembly of the invention.

When the dispensing receptacle 26 is in the first, or media loading position shown in FIG. 9, the beverage media contained within reservoir 20 is free to flow by force of gravity through opening 26b into the receptacle chamber 26a. When the dispensing receptacle 26 is rotated into the second, or dispensing position shown in FIG. 10, the beverage media contained within the receptacle chamber 26a is free to flow by force of gravity into the inlet 42a of funnel shaped segment 42 and then into the interior of the single serve filter cup "FC" (see FIG. 6). As illustrated in FIG. 4 of the drawings, funnel shaped segment 42a is held in position within housing 16 by a mounting assembly 50.

When the beverage media contained within the reservoir 20 is ultra-fine in nature, such as, for example, Turkish coffee, it has been observed that the beverage media tends to clump and not flow freely into and out of the receptacle chamber 26a of the dispensing receptacle. This undesirable clogging of the beverage media can result in an incomplete filling of the single serve filter cup and the resulting incorrect brewing of the beverage media. As previously mentioned herein, a primary object of the present invention is to inhibit this undesirable clogging of the beverage media by providing an agitation device that is carried by the housing and functions to inhibit clogging of the granular material during the beverage media dispensing operation.

In the embodiment of the invention shown in FIG. 4 of the drawings, the important agitation device is provided in the form of a vibratory motor 52 that is affixed to the lower sidewall of the reservoir 20 in the manner there shown. While suitable vibratory motors such as motor 52 are available from various sources, a motor offered for sale by a Precision Micro Drives, LTD of London, England has proven satisfactory for use in the apparatus of the invention.

Figure 15:
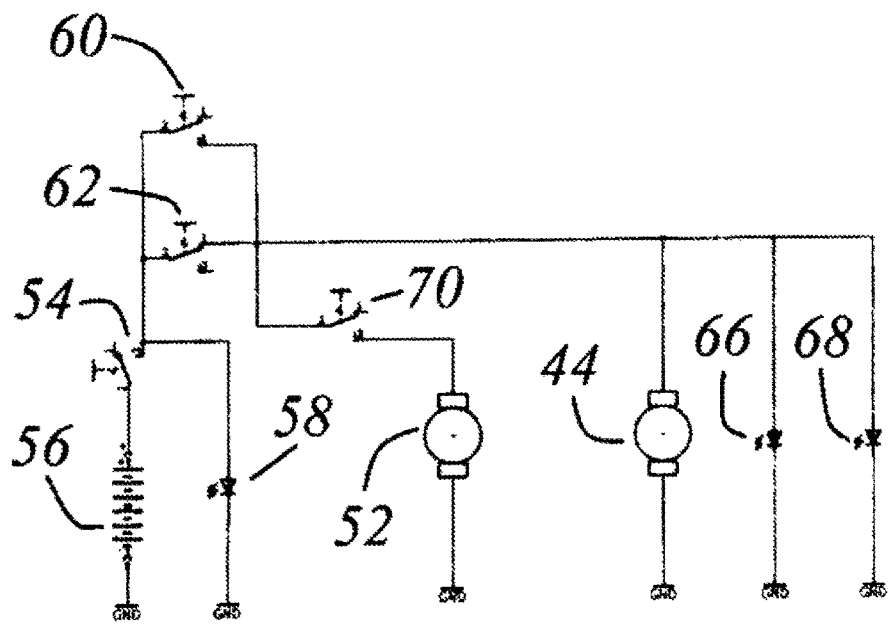
FIG. 15 is a generally schematic circuit diagram illustrating the electric circuitry of the embodiment of the dispensing apparatus shown in FIGS. 1 through 10 of the drawings.

In the operation of the dispensing apparatus of the invention, after lifting the cover 36 in the manner shown in FIG. 1, reservoir 20 can be filled with the beverage media with which the single serve filter cup FC is to be filled. This done, the filter cup can be inserted into the receiving opening 18 of the housing by moving it from the first position shown in FIGS. 1 and 5 of the drawings into the second inserted position shown in FIG. 6. As the filter cup is inserted into opening 18 it will engage a cam 53 that is pivotally connected to receptacle housing 38 in the manner shown in FIG. 8 of the drawings causing the cam to act upon and close a normally open, conventional limit switch 54 that is carried by the dispensing assembly 28. As shown in FIG. 15 of the drawings, which depicts the electrical circuit of this form of the invention, limit switch 54 is connected to a battery power source 56. Battery 56 is housed within a battery chamber 56a that is closed by a removable door 56b. In operation, when the switch is closed by the cam 53 acting upon limit switch 54 as the filter cup is inserted into the receiving opening 18, the electrical circuit is energized and an LED light source 58 is illuminated. Light source 58, which is preferably green in color is mounted on the rear wall 18a of opening 18 (FIG. 4) and functions to illuminate the cup receiving opening and to indicate to the user that the cup is properly positioned within the opening.

With the single serve filter cup properly positioned within the receiving opening 18, the filling cycle can be commenced by the user pushing down on a pushbutton type, momentary cycle start switch 60 that is mounted on the forwardly extending protuberance 30 of housing 16. Operably associated with limit switch 54 and cycle start switch 60 is a second limit switch 62. Second limit switch 62, which, as illustrated in FIG. 8 of the drawings, is mounted on mounting assembly 46, is normally open when the dispensing receptacle 26 is in the first, or media loading position shown in FIG. 9 of the drawings.

To commence the cup filling process, the user presses the cycle start switch 60 which energizes the motor 44 causing dispensing receptacle 26 to commence rotation. Rotation of the dispensing receptacle 26 causes a cam 64, which forms a part of and extends outwardly from dispensing receptacle 26, to act upon and close the second limit switch 62, thereby energizing LEDs 66 and 68. LED 66 is preferably a blue light emitting diode which forms a part of the pushbutton type, momentary cycle start switch 60 (see FIGS. 1 and 4). LED 68 is preferably a white light emitting diode which is mounted on the upper portion 16a of housing 16 and illuminates the reservoir 20 enabling the user to view the level of the brewing media within the reservoir by looking through the viewing window 32. When the dispensing receptacle 26 rotates from the first position shown in FIG. 9 of the drawings into the second position shown in FIG. 10, the brewing media contained within chamber 26a of the dispensing receptacle flows by force of gravity into the single serve filter cup FC substantially filling the cup.

Figure 8:
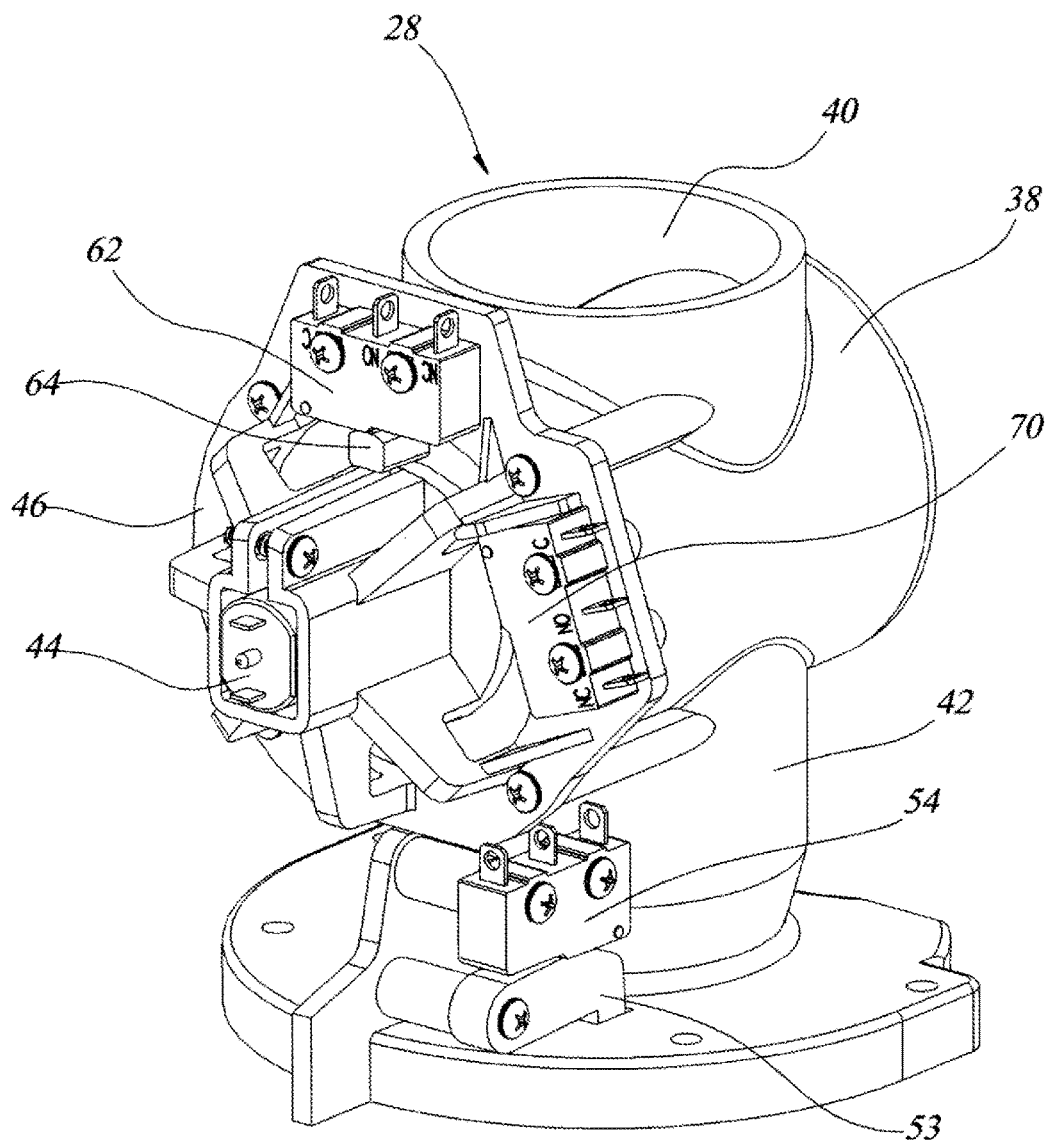
FIG. 8 is a greatly enlarged, rear perspective view of the dispensing assembly of the invention further illustrating the location and construction of the various switching mechanisms of the invention which form a part of the electrical circuitry of one embodiment of the invention.

Shortly prior to the dispensing receptacle reaching the second position shown in FIG. 10, the cam 64 acts upon and closes a third limit switch 70 which is mounted on mounting assembly 46 and is operably associated with vibratory motor 52 (see FIGS. 4 and 8). Closure of switch 70 briefly energizes vibratory motor 52 causing the motor to vigorously vibrate the reservoir 20 and the dispensing receptacle 26 in a manner to unclog any of the brewing media that might have become clogged during the dispensing step.

When the dispensing receptacle 26 completes one 360 degree revolution and returns to the first position shown in FIG. 9 of the drawings, cam 64 once again acts upon and opens switch 62 thereby de-energizing motor 44 as well as LED 66 and LED 68. At this point, the single serve filter cup FC can be removed from chamber 18 causing switch 54 to de-energize LED 58.

Turning now to FIGS. 11 through 14 of the drawings, an alternate form of the dispensing apparatus of the invention is there shown and generally designated by the numeral 74. This alternate form of the apparatus is similar in many respects to the embodiment of the invention shown in FIGS. 1 through 10 of the drawings and described in the preceding paragraphs. Accordingly, like numerals are used in FIGS. 11 through 14 and 16 to identify like components. Dispensing apparatus 74 comprises a housing 16 having a media reservoir 20, a dispensing assembly 28 and an electric motor 44 all of which are of identical construction and operation to those previously described herein. The primary difference between this latest embodiment of the invention and the embodiment shown in FIGS. 1 through 10 resides in the provision of a totally different agitation device for controllably agitating the media reservoir and the dispensing receptacle of the apparatus during the beverage media dispensing operation.

Figure 11:
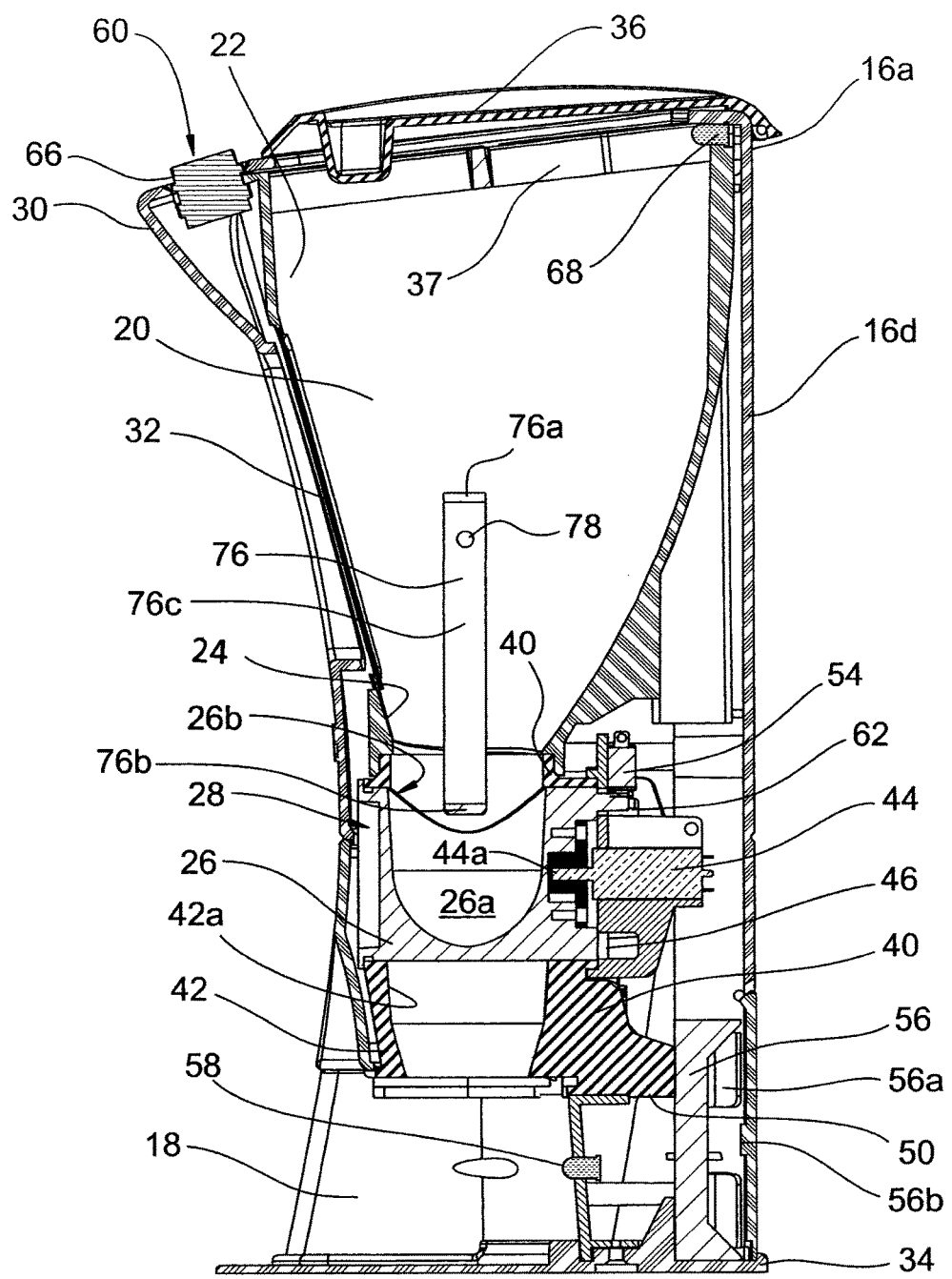
FIG. 11 is a cross-sectional view of an alternate embodiment of the dispensing apparatus of the invention.
Figure 12:
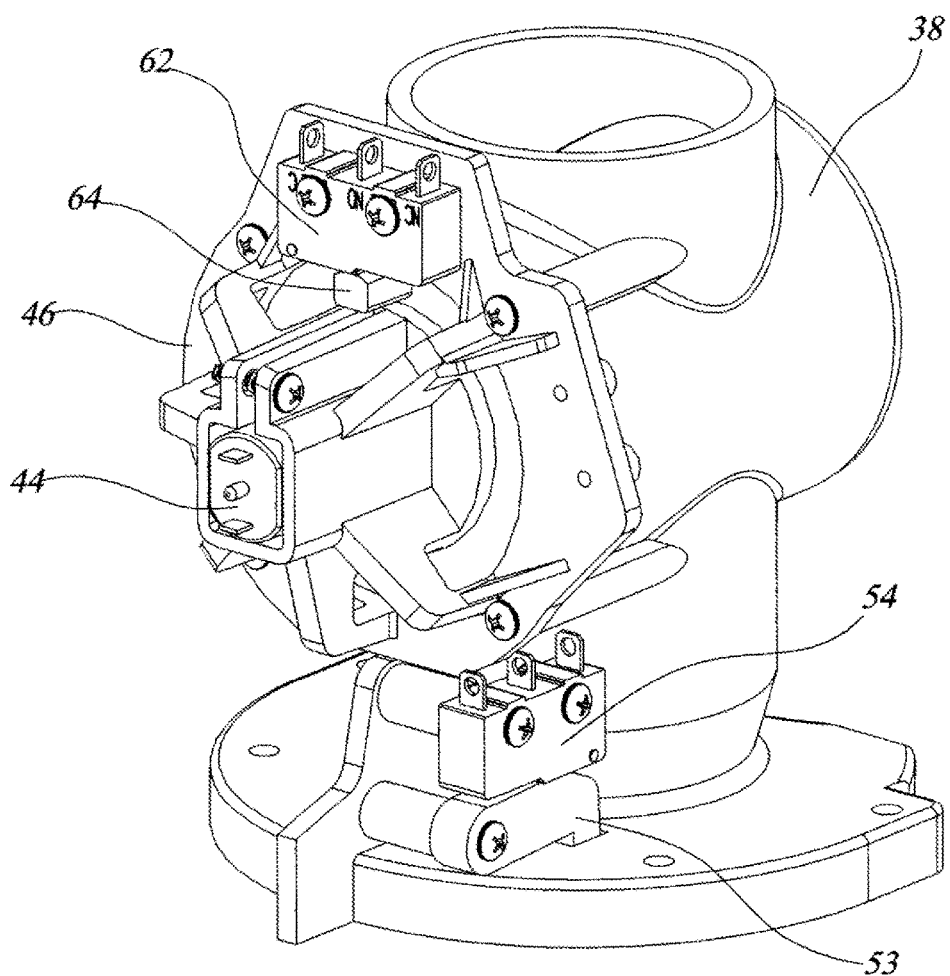
FIG. 12 is a greatly enlarged, rear perspective view of the dispensing assembly of the form of the invention shown in FIG. 11, illustrating the location and construction of the various switching mechanisms of this alternate embodiment of invention which form a part of the electrical circuitry of the alternate embodiment of the invention.
Figure 13:
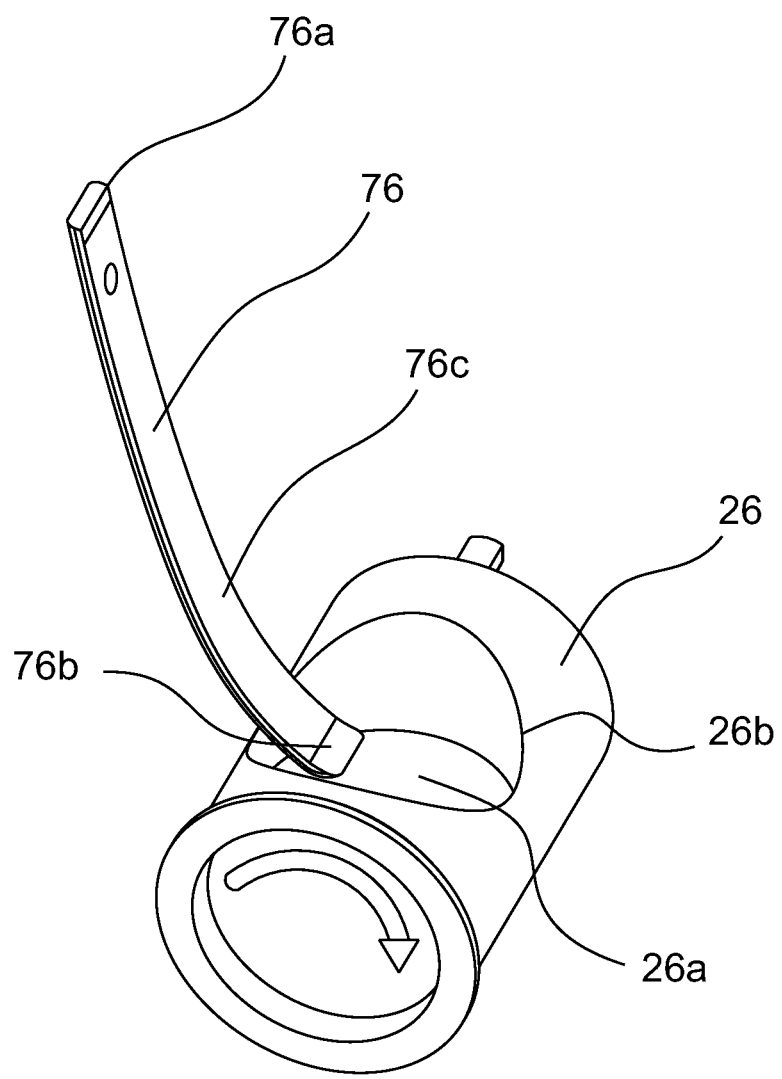
FIG. 13 is a greatly enlarged, fragmentary isometric view of the central portion of the alternate form of the dispensing apparatus shown in FIG. 11 and illustrating the position of the yieldably deformable agitation finger of the invention when the dispensing receptacle is in a first position.
Figure 14:
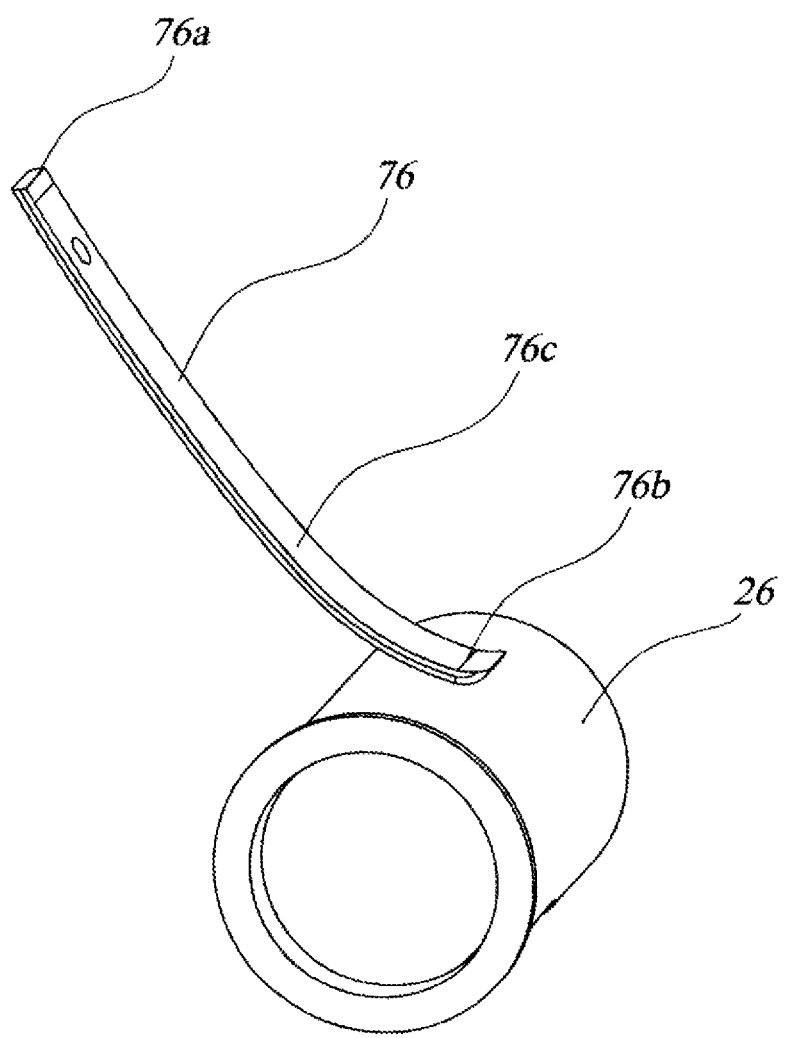
FIG. 14 is a greatly enlarged, fragmentary isometric view similar to FIG. 13, but showing the position of the yieldably deformable agitation finger of the invention when the dispensing receptacle has been rotated into a second position.

In this latest embodiment of the invention, the important agitation device is provided in the form of a yieldably deformable, elongated finger 76 that is of the character illustrated in FIGS. 11, 13 and 14 of the drawings. Finger 76 is operably associated with dispensing receptacle 26 and functions to prevent the brewing media from clogging in the reservoir 20 and not completing the accurate filling of the filter cup during the filling step. Finger 76 includes a first end 76a, a second free end 76b and a flexible central portion 76c. As illustrated in FIG. 11, first end 76a is affixed to the interior wall of reservoir 20 by means of a conventional connector 78 and second free end 76b is disposed in engagement with the dispensing receptacle 26 of dispensing assembly 28. When the dispensing receptacle 26 is the first position shown in FIG. 11 of the drawings, the second free end 76b of the finger extends into chamber 26a in the manner shown in FIG. 13 of the drawings. However, as shown in FIG. 14, when the dispensing receptacle has rotated into the second position, the free end 76b of the flexible finger has moved into sliding engagement with the exterior cylindrical surface of the dispensing receptacle and will remain in engagement therewith until the dispensing receptacle has returned to its starting position where it will once again snapped into chamber 26a. This movement of the flexible finger within the device reservoir and its interaction with the dispensing receptacle during the cup filling step functions to effectively break up any clogging of the brewing media thereby allowing it to flow freely from the reservoir 20 into the dispensing receptacle 26 and from the dispensing receptacle into the filter cup FC.

Figure 16:
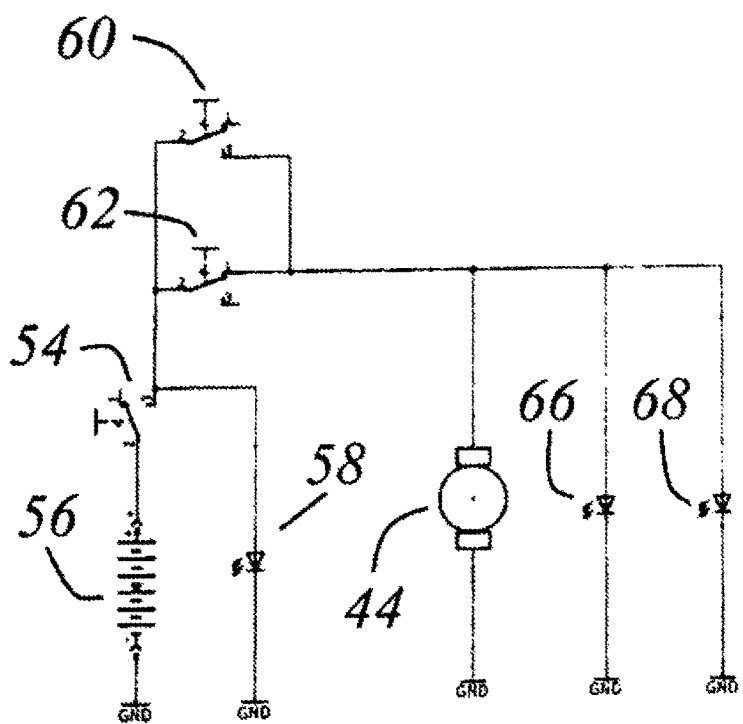
FIG. 16 is a generally schematic circuit diagram illustrating the electric circuitry of the second embodiment of the dispensing apparatus shown in FIGS. 11 through 14 of the drawings.

FIG. 16 of the drawings depicts the electrical circuitry of the second form of the invention 74. This circuitry is similar in many respects to the circuitry of the earlier described embodiment of the invention and like numerals are used in FIG. 16 to identify like components. The primary difference between the circuitry shown in FIGS. 15 and 16 resides in the absence of the vibratory motor 44 in the circuit depicted in FIG. 16.

The operation of the dispensing apparatus 74 of this latest form of the invention is similar in many respects to the operation of the earlier described form of the dispensing apparatus 14 and the commencement of the operation begins by the insertion of the filter cup FC into the receiving opening 18 and the closing of the normally open, conventional limit switch 54 that is that is carried by the dispensing assembly 28. As before, this switch is acted upon and closed by a cam 53 that is pivotally mounted on mounting plate 50 in the manner shown in FIG. 12 of the drawings. Limit switch 54 is connected to a battery power source 56 so that when the switch is closed, the electrical circuit is energized and LED light source 58 illuminates the cup receiving opening indicating to the user that the cup is properly positioned within the opening.

With the single serve filter cup properly positioned within the receiving opening 18, the filling cycle can be commenced by pushing down on pushbutton type, momentary cycle start switch 60 that is mounted on the forwardly extending protuberance 30 of housing 16. Pushing down on switch 60 energizes the motor 44 causing dispensing receptacle 26 to commence rotation. As in the earlier described embodiment of the invention, rotation of the dispensing receptacle 26 causes cam 64 to act upon and close second limit switch 62, thereby energizing LEDs 66 and 68. Illumination of LED 68 enables the user to view the level of the brewing media within the reservoir by looking through the viewing window 32.

As before, when the dispensing receptacle 26 rotates from its first position into its second position, the brewing media contained within chamber 26a of the dispensing receptacle is free to flow by force of gravity into the single serve filter cup FC substantially filling the cup. As previously discussed, at the commencement of the cup filling step and when the dispensing receptacle 26 is in the first position shown in FIG. 11 of the drawings, the second free end 76b of the finger extends into chamber 26a in the manner shown in FIG. 13 of the drawings. However, when the dispensing receptacle has rotated into the second position, the free end 76b of the flexible finger has moved into sliding engagement with the exterior cylindrical surface of the dispensing receptacle and will remain in engagement therewith until the dispensing receptacle has returned to its starting position where it will once again snapped into chamber 26a. This agitating action by the flexible finger functions to effectively break up any clogging of the brewing media that may have occurred thereby allowing it to flow freely into interior chamber 26a and into the filter cup FC.

When the dispensing receptacle 26 completes one 360 degree revolution and returns to its first position, cam 64 once again acts upon and opens switch 62 thereby de-energizing motor 44 as well as LED 66 and LED 68. At this point, the single serve filter cup FC can be removed from chamber 18 causing switch 54 to de-energize LED 58.

If desired, a simple modification to the circuitry of the invention can be made by one skilled in the art to prevent inadvertent activation of the motor and the consequential undesirable overfilling of the single serve filter cup. More particularly, by the integration into the circuit of a normally open, normally closed switching relay, activation of the motor 44 can be prevented until switch 54 (FIG. 5) is released by removal of the previously filled single serve filter cup. Stated another way, by adding the switching relay to the electrical circuit in a manner well understood by those skilled in the art, the activation of the filling cycle can be prevented until the filled filter cup has been removed and an empty filter cup has been properly inserted into the receiving opening 18.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

We claim:

1. A dispensing apparatus for controllably dispensing a beverage media into a single serve filter cup comprising:
    (a) a housing having a single serve filter cup receiving opening for receiving the single serve filter cup and a reservoir for holding a volume of the beverage media, said reservoir having an inlet opening for receiving the beverage media and an outlet opening for delivering the beverage media;
    (b) a dispensing assembly carried by said housing for controllably dispensing the beverage media, said dispensing assembly comprising a dispensing receptacle including an interior chamber having an opening;
    (c) a dispensing mechanism carried by said housing and operably associated with said dispensing receptacle for rotating said dispensing receptacle between a first position wherein said opening is aligned with said reservoir outlet opening and a second position wherein said opening is aligned with the single serve filter cup; and
    (d) an agitation device carried by said housing and operably associated with said reservoir, said agitation device functioning to inhibit clogging of said beverage media.

2. The dispensing apparatus as defined in claim 1 in which said dispensing mechanism comprises an electric motor.

3. The dispensing apparatus as defined in claim 1 in which said agitation device comprises a vibratory motor connected to said reservoir of said housing.

4. The dispensing apparatus as defined in claim 1 further including a generally funnel shaped segment carried by said housing and operably associated with said dispensing receptacle for receiving the beverage media there from when said dispensing receptacle is in said second position.

5. The dispensing apparatus as defined in claim 1 in which said agitation device comprises a yieldably deformable finger having a first end affixed to said reservoir and a second free end disposed in engagement with said dispensing receptacle.

6. The dispensing apparatus as defined in claim 5 in which said dispensing receptacle has an interior chamber and in which said free end of said agitation device is receivable within said interior chamber when said dispensing receptacle is in said second position.

7. The dispensing apparatus as defined in claim 6 in which said housing is provided with a viewing window.

8. The dispensing apparatus as defined in claim 7 further including a light carried by said housing for illuminating said reservoir.

9. The dispensing apparatus as defined in claim 7 further including an access cover pivotally connected to said housing for closing said inlet opening of said reservoir.

10. The dispensing apparatus as defined in claim 7 further including a light carried by said housing proximate said single serve filter receiving opening for illuminating said single serve filter cup.

11. A dispensing apparatus for controllably dispensing a granular material into a receptacle comprising:
   (a) a housing having a receptacle receiving opening for receiving the receptacle and a reservoir for holding a volume of the granular material, said reservoir having an inlet opening for receiving the granular material and an outlet opening for delivering the granular material;
   (b) a dispensing assembly carried by said housing for controllably dispensing the granular material, said dispensing assembly comprising a dispensing receptacle including an interior chamber having an opening;
   (c) a dispensing receptacle motor carried by said housing and operably associated with said dispensing receptacle for rotating said dispensing receptacle between a first position wherein said opening is aligned with said reservoir outlet opening and a second position wherein said opening is aligned with the receptacle; and
   (d) an agitation device carried by said housing for inhibiting clogging of said granular material.

12. The dispensing apparatus as defined in claim 11 in which said agitation device comprises a vibratory motor connected to said reservoir of said housing.

13. The dispensing apparatus as defined in claim 11 in which said agitation device comprises a yieldably deformable finger having a first end affixed to said reservoir and a second free end disposed in engagement with said dispensing receptacle.

14. The dispensing apparatus as defined in claim 13 in which said dispensing receptacle has an interior chamber and in which said free end of said agitation device is receivable within said interior chamber when said dispensing receptacle is in said second position.

15. A dispensing apparatus for controllably dispensing a beverage media into a single serve filter cup comprising:
   (a) a housing having a single serve filter cup receiving opening for receiving the single serve filter cup and a reservoir for holding a volume of the beverage media, said reservoir having an inlet opening for receiving the beverage media and an outlet opening for delivering the beverage media;
   (b) a dispensing assembly carried by said housing for controllably dispensing the beverage media, said dispensing assembly comprising a dispensing receptacle including an interior chamber having an opening; and
   (c) an electric motor carried by said housing and operably associated with said dispensing receptacle for rotating said dispensing receptacle between a first position wherein said opening is aligned with said reservoir outlet opening and a second position wherein said opening is aligned with the single serve filter cup.

16. A dispensing apparatus for controllably dispensing a beverage media into a single serve filter cup comprising:
   (a) a housing having a single serve filter cup receiving opening for receiving the single serve filter cup and a reservoir for holding a volume of the beverage media, said reservoir having an inlet opening for receiving the beverage media and an outlet opening for delivering the beverage media;
   (b) a dispensing assembly carried by said housing for controllably dispensing the beverage media, said dispensing assembly comprising a dispensing receptacle including an interior chamber having an opening;
   (c) a dispensing mechanism carried by said housing and operably associated with said dispensing receptacle for rotating said dispensing receptacle between a first position wherein said opening is aligned with said reservoir outlet opening and a second position wherein said opening is aligned with the single serve filter cup; and
   (d) an agitation device carried by said housing and operably associated with said reservoir for controllably agitating said reservoir to inhibit clogging of said beverage media.

17. The dispensing apparatus as defined in claim 16 in which said agitation device comprises a vibratory motor connected to said reservoir of said housing.

18. The dispensing apparatus as defined in claim 16 in which said agitation device comprises a yieldably deformable finger having a first end affixed to said reservoir and a second free end disposed in engagement with said dispensing receptacle.

19. The dispensing apparatus as defined in claim 18 in which said dispensing receptacle has an interior chamber and in which said free end of said agitation device is receivable within said interior chamber when said dispensing receptacle is in said second position.

* * * * *